US008443028B2

(12) United States Patent
Reidenbach

(10) Patent No.: US 8,443,028 B2
(45) Date of Patent: May 14, 2013

(54) CIRCUITS AND METHODS FOR PERFORMING EXPONENTIATION AND INVERSION OF FINITE FIELD ELEMENTS

(75) Inventor: Bruce Reidenbach, Albion, IN (US)

(73) Assignee: Exelis Inc., McLean, VA (US)

( * ) Notice: Subject to any disclaimer, the term of this patent is extended or adjusted under 35 U.S.C. 154(b) by 1016 days.

(21) Appl. No.: 12/476,389

(22) Filed: Jun. 2, 2009

(65) Prior Publication Data
US 2010/0306299 A1  Dec. 2, 2010

(51) Int. Cl.
*G06F 7/726* (2006.01)
*G06F 17/10* (2006.01)

(52) U.S. Cl.
USPC .......................................... 708/492; 708/277

(58) Field of Classification Search .................. 708/277, 708/492
See application file for complete search history.

(56) References Cited

U.S. PATENT DOCUMENTS

| | | | |
|---|---|---|---|
| 5,890,800 A | | 4/1999 | Meyer |
| 6,101,520 A | * | 8/2000 | Lan et al. ....................... 708/492 |
| 6,138,133 A | * | 10/2000 | Oh ................................ 708/492 |
| 6,779,011 B2 | * | 8/2004 | Weng et al. ................... 708/492 |
| 2002/0032711 A1 | | 3/2002 | Morioka et al. | |

OTHER PUBLICATIONS

Dr. Somsak Choomchuay, "On the Implementation of Finite Field Basis Conversions," 1994, King Mongkut's Institute of Technology, North Bangkok, pp. 482-486.*
Choomchuay S., "On the Implementation of Finite Field Operations", Ladkrabang Engineering Journal, TH, vol. 11, No. 1, Jun. 1, 1994, pp. 7-16.
Jorge Guajardo et al., "Efficient Hardware Implementation of Finite Fields with Applications to Cryptography", Acta Applicandae Mathematicae, Kluwer Academic Publishers, DO LNKD-DOI: 10.1007/S10440-006-9072-Z, vol. 93, No. 1-3, Sep. 26, 2006, pp. 75-118.
European Search Report dated Sep. 20, 2010 cited in Application No. 10161704.1.

* cited by examiner

*Primary Examiner* — Tammara Peyton
(74) *Attorney, Agent, or Firm* — Edell, Shapiro & Finnan, LLC

(57) ABSTRACT

An exponentiation circuit for computing an exponential power of a finite field element includes combinatory logic circuits that map input digits of a multi-digit field element $\beta$ to output digits of an output multi-digit field element $\beta^{2^m}$. The exponentiation circuit is capable of computing a power of a field element without performing any multiplication operations and requires only exclusive-OR logic operations to generate the output exponential field element. A circuit for generating a multiplicative inverse of a finite field element can be constructed from a set of parallel exponentiation circuits, with each of the parallel exponentiation circuits generating a different multi-digit field element $\beta^{2^m}$ directly from the input field element $\beta$. Multiplier circuits multiply together the outputs of the parallel exponentiation circuits to generate the multiplicative inverse of the field element $\beta$.

20 Claims, 6 Drawing Sheets

US 8,443,028 B2

CIRCUITS AND METHODS FOR PERFORMING EXPONENTIATION AND INVERSION OF FINITE FIELD ELEMENTS

BACKGROUND

Communication systems, particularly wireless communications and high-speed transmissions, often require the use of forward error correction algorithms to identify bit errors in received signals. Finite field arithmetic is highly useful in such forward error correction algorithms. Encryption algorithms also commonly use finite field arithmetic.

A finite field, commonly called a Galois field, is a field that contains only a finite number of numerical elements. One example of a Galois field is a set of five-digit binary numbers. There are a total of 32 such numbers and, for example, 31 of those numbers could constitute a Galois field. An important characteristic of a Galois field is that the arithmetic operators (addition, subtraction, multiplication, and division) are defined such that any arithmetic operation performed on elements of the field will always yield one of the elements in the field. In the binary example given, the addition and subtraction operations can be carried out as exclusive-OR (XOR) logic operations, and multiplication can be carried out as logical shifts, AND, and XOR operations. Note that in some cases, such operations will yield results that are not within the set of five-digit numbers. However, as applied within the Galois field, these arithmetic operations are defined using an irreducible generator polynomial which creates a modulo operation on the result, whereby the result remains within the Galois field (i.e., the result is one of the finite number of elements).

In the discipline of Galois field mathematics, addition, subtraction, and multiplication of field elements are well understood, and these operations can be mapped efficiently into hardware or software domains. However, dividing one field element by another in a Galois field does not map very efficiently into either of the hardware or software domains. The most accepted way of performing division is to multiply the dividend by the multiplicative inverse of the divisor, as follows:

$$\beta_i / \beta_j = \beta_i \times \beta_j^{-1} \qquad (1)$$

where, $\beta_i$, and $\beta_j$ are elements of the field. The multiplicative inverse of an element of a Galois field can be found either by using a ROM-based a look-up table (LUT) or by using a recursive circuit to implement Fermat's Little Theorem (Pierre de Fermat, first published in 1640). Using the look-up table approach, the function requires a fair amount of memory to implement, specifically $2^m \times m$, where $2^m = N+1$, and N is the number of elements in the Galois field.

Fermat's Little Theorem states that, for any Galois field element $\beta$, the multiplicative inverse can be found by computing $\beta^{-1} = \beta^{N-2}$, where N is the total number of elements in the field. $\beta^{N-2}$ can be found recursively via two methods:

$$\beta^{-1} = \beta^{N-2} = \beta^2 \times \beta^4 \times \beta^8 \times \ldots \times \beta^{2^{m-1}} \qquad (2)$$

$$\beta^{-1} = \beta^{N-2} = (\beta \times \ldots (\beta \times (\beta \times \beta^2)^2)^2 \ldots)^2 \qquad (3)$$

where $2^m = N+1$. Using equation (2), the ability to efficiently raise a Galois field element to a power of $2^m$, i.e., 2, 4, 8, etc., is of critical importance. In equation (3), it is the ability to efficiently square a Galois field element that is the most critical item. For either recursive approach, the $\beta^m$ operation is performed via a recursive application of a squaring operation, which is accomplished by multiplying the field element by itself.

FIG. 1 illustrates a serial computation architecture 100 required to implement the approach of equation (2). In particular, a squaring operation 102 denoted by $(\ )^2$ is performed on the element $\beta$ to produce $\beta^2$. A second squaring operation 104 is performed on the output $\beta^2$ of the first squaring operation 102 to produce $\beta^4$. A first multiplication operation 106 is then performed on the outputs of the first and second squaring operations 102 and 104 ($\beta^2$ and $\beta^4$) to yield $\beta^6$. A third squaring operation 108 is performed on the output $\beta^4$ of the second squaring operation 104 to produce $\beta^8$. A second multiplication operation 110 is then performed on the outputs of the first multiplication operation 106 ($\beta^6$) and the third squaring operation 108 ($\beta^8$) to yield $\beta^{14}$. This process is repeated for m−2 stages until the output of the multiplier of the m−2$^{th}$ stage yields $\beta^{N-2}$. For example, where m=5 and $2^m = N+1 = 32$, the circuit in FIG. 1 would include one additional stage with squaring operation 112 and multiplication operation 114 to yield an output value $\beta^{30} = \beta^{-1}$. Each of the squaring operations and multiplication operations can be carried out by performing an actual multiplication operation in hardware or software or by using a look-up table.

FIG. 2 illustrates the serial computation architecture 200 required to implement the approach of equation (3). In particular, a squaring operation 202 denoted by $(\ )^2$ is performed on the element $\beta$ to produce $\beta^2$. A second squaring operation 204 is performed on the output $\beta^2$ of the first squaring operation 202 to produce $\beta^4$. A first multiplication operation 206 is then performed on the outputs of the first and second squaring operations 202 and 204 ($\beta^2$ and $\beta^4$) to yield $\beta^6$. A third squaring operation 208 is performed on the output $\beta^6$ of the first multiplication operation 206 to produce $\beta^{12}$. A second multiplication operation 210 is then performed on the output of the third squaring operation 208 ($\beta^{12}$) and the output of the first squaring operation 202 ($\beta^2$) to yield $\beta^{14}$. This process is repeated for m−2 stages until the output of the m−2$^{th}$ stage yields $\beta^{N-2}$. For example, where m=5 and $2^m = N+1 = 32$, the circuit in FIG. 2 would include one additional stage with squaring operation 212 and multiplication operation 214 to yield an output value $\beta^{30} = \beta^{-1}$.

The types of serial architecture shown in FIGS. 1 and 2 have long computation delays, decreasing the data throughput. Accordingly, there remains a need for an efficient approach to computing the multiplicative inverse of elements in a Galois field.

SUMMARY

A technique is described herein for constructing a field exponentiation circuit to any power of $2^m$ based upon matrix algebra, which greatly reduces the amount of hardware required, reduces the processing delay through the circuit, and increases data throughput. The field exponentiation circuit is particularly useful for computing powers of an element of a Galois field having an exponent of $2^m$ (i.e., powers of 2, 4, 8, 16, etc.), which can be used to compute the multiplicative inverse of the element as necessary to carry out division.

In accordance with one embodiment, an exponentiation circuit for computing an exponential power of a finite field element includes combinatory logic circuits that map input digits (e.g., bits) of a multi-digit field element $\beta$ to output digits (bits) of an output multi-digit field element $\beta^{2^m}$. Certain output digits are generated by the combinatory logic circuits as logical combinations of certain input digits. In some instances, at least some of the output digits are generated by the combinatory logic circuits from only one of the input digits by directly mapping an input digit to an output digit.

An underlying exponentiation matrix determines the mapping of the input bits to the output bits and can be implemented in combinatory logic circuits requiring only exclusive-OR combinations. In this manner, the exponentiation circuit is capable of computing a power of a field element without performing any multiplication operations.

A circuit for generating a multiplicative inverse of a finite field element can be constructed from a plurality of parallel exponentiation circuits, with each of the parallel exponentiation circuits generating a different multi-digit field element $\beta^{2^m}$ directly from the input field element $\beta$. Multiplier circuits multiply together the outputs of the parallel exponentiation circuits to generate the multiplicative inverse of the field element $\beta$. The underlying matrix algebra concept can be further extended to construct circuits that multiply a finite field element by a constant using only combinatory logic circuits.

The above and still further features and advantages of the present invention will become apparent upon consideration of the following definitions, descriptions and descriptive figures of specific embodiments thereof wherein like reference numerals in the various figures are utilized to designate like components. While these descriptions go into specific details of the invention, it should be understood that variations may and do exist and would be apparent to those skilled in the art based on the descriptions herein.

DETAILED DESCRIPTION

The invention described herein presents a novel technique for constructing a field exponentiation circuit to any power of $2^m$ based upon matrix algebra, which greatly reduces the amount of hardware required, reduces the processing delay through the circuit, and increases the data throughput. The field exponentiation circuit is particularly useful for computing powers of an element of a Galois field having an exponent of $2^m$ (i.e., powers of 2, 4, 8, 16, etc.), which can be used to compute the multiplicative inverse of the element as necessary to carry out division in accordance with equation (1).

Figure 3:
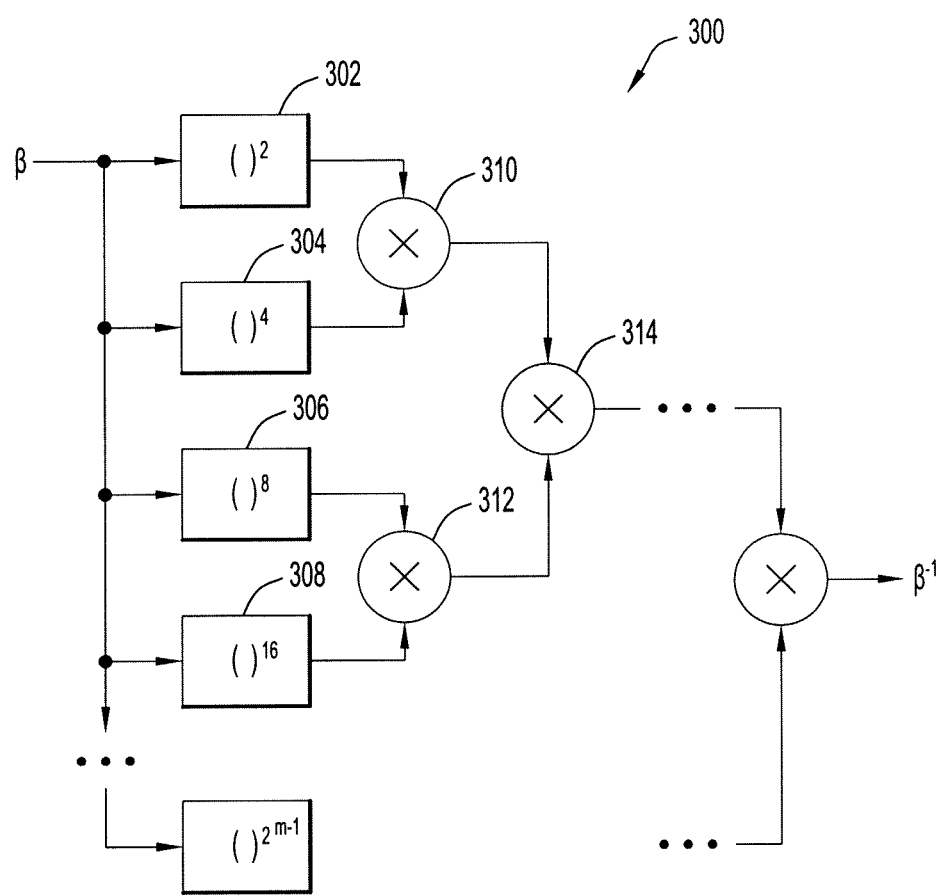
FIG. 3 is a block diagram illustrating a parallel computation architecture for computing a multiplicative inverse of an element of a Galois field in accordance with an embodiment of the invention.

FIG. 3 is a block diagram illustrating the circuit topology for the approach described herein. The architecture depicted in FIG. 3 is a conceptual diagram illustrating major functional units, and does not necessarily illustrate physical relationships. Like the circuit topology shown in FIG. 1, powers of $2^m$ of an input element $\beta$ are computed to support determination of the multiplicative inverse $\beta^{-1}$ according to equation (2) above. However, the circuit topology shown in FIG. 3 has the advantage of computing the several $\beta^{2^m}$ component values in parallel and computing products of these values in parallel, which decreases the data throughput delay. In particular, the input element $\beta$ whose inverse is to be determined is supplied directly to each exponentiation circuit 302, 304, 306, and 308 in parallel. Exponentiation circuit 302 generates an output $\beta^2$. In parallel with circuit 302, exponentiation circuit 304 generates an output $\beta^4$, exponentiation circuit 306 generates an output $\beta^8$, exponentiation circuit 308 generates an output $\beta^{16}$, and so on up to $\beta^{2^{m-1}}$. Note that all of these circuits generate their respective power of $\beta$ directly from the input of the element $\beta$ itself. None of the outputs of any of the exponentiation circuits is used as an input to any other exponentiation circuits.

As shown in FIG. 3, the outputs of exponentiation circuits are multiplied together to generate the final output. In particular, a multiplication circuit 310 performs a multiplication operation on the output of exponentiation circuit 302 ($\beta^2$) and the output of exponentiation circuit 304 ($\beta^4$) to yield $\beta^6$. Likewise, a multiplication circuit 312 performs a multiplication operation on the output of exponentiation circuit 306 ($\beta^8$) and the output of exponentiation circuit 308 ($\beta^{16}$) to yield $\beta^{24}$. Higher order exponential terms are multiplied in pairs in the same manner, as applicable, depending on the value of m, up to the power of $2^{m-1}$ (i.e., up to $\beta^{2^{m-1}}$). In the case of m=5 and $2^m$=N+1=32, exponentiation circuit 308 is the highest order required. In this case, to compute the inverse of element $\beta$, a multiplication circuit 314 performs a multiplication operation on the output of multiplication operation 310 ($\beta^6$) and the output of multiplication operation 312 ($\beta^{24}$) to yield $\beta^{30}=\beta^{N-2}=\beta^{-1}$. The multiplication circuits 310, 312, and 314 shown in FIG. 3 can be implemented in hardware and/or software and can carry out a multiplication operation or be implemented as a look-up table.

As explained below in greater detail, the technique described herein is capable of generating the $\beta^{2^m}$ elements in a manner that both requires less circuitry and that is considerably faster than traditional circuitry. Each of the parallel exponential stages requires only simple logic circuitry to generate the output exponential value from the input element value and completely avoids the need to perform multiplication operations in the exponential stages or the need for a serial arrangement of any exponential stages. As used herein and in the claims, the terms "circuit" and "circuitry" refer to any hardware, software, look-up table, or combinations thereof for performing logical or arithmetic operations. Thus, for example, any of the exponential operations, multiplication operations, and logical components thereof shown in the figures can be implemented in hardware, software, look-up tables, or combinations thereof, and the terms "circuit" and "circuitry" are to be understood to cover any of these implementations.

The derivation of the $2^m$ circuit elements 302, 304, 306, and 308 shown in FIG. 3 is as follows:

Given that $\beta$ is an element of a Galois field of size $2^n$ ($\beta \in GF(2^n)$), $\beta$ may be represented as:

$$\beta = \sum_{i=0}^{n-1} \beta_i \alpha^i, \beta_i \in \{0, 1\} \tag{4}$$

Staying with the example described above, where m=5, each element $\beta$ in the field would be a five-digit binary number. If each digit (bit) is assigned a subscript designating its order, the element $\beta$ can be expressed as: $\beta_4, \beta_3, \beta_2, \beta_1, \beta_0$. For example, if $\beta$=11010, then $\beta_4$=1, $\beta_3$=1, $\beta_2$=0, $\beta_1$=1, and $\beta_0$=0.

Using the standard algebraic sum of partial sums method, $\beta^2$ is computed as follows:

$$\begin{array}{r}\beta_4\alpha^4 + \beta_3\alpha^3 + \beta_2\alpha^2 + \beta_1\alpha^1 + \beta_0\alpha^0 \times \\ \beta_4\alpha^4 + \beta_3\alpha^3 + \beta_2\alpha^2 + \beta_1\alpha^1 + \beta_0\alpha^0 \\ \hline \beta_4\beta_0\alpha^4 + \beta_3\beta_0\alpha^3 + \beta_2\beta_0\alpha^2 + \beta_1\beta_0\alpha^1 + \beta_0^2\alpha^0 \\ \beta_4\beta_1\alpha^5 + \beta_3\beta_1\alpha^4 + \beta_2\beta_1\alpha^3 + \beta_1^2\alpha^2 + \beta_1\beta_0\alpha^1 \\ \beta_4\beta_2\alpha^6 + \beta_3\beta_2\alpha^5 + \beta_2^2\alpha^4 + \beta_2\beta_1\alpha^3 + \beta_2\beta_0\alpha^2 \\ \beta_4\beta_3\alpha^7 + \beta_3^2\alpha^6 + \beta_3\beta_2\alpha^5 + \beta_3\beta_1\alpha^4 + \beta_3\beta_0\alpha^3 \\ \beta_4^2\alpha^8 + \beta_4\beta_3\alpha^7 + \beta_4\beta_2\alpha^6 + \beta_4\beta_1\alpha^5 + \beta_4\beta_0\alpha^4 \\ \hline \beta_4^2\alpha^8 + \quad\quad \beta_3^2\alpha^6 + \quad\quad \beta_2^2\alpha^4 + \quad\quad \beta_1^2\alpha^2 + \quad\quad \beta_0^2\alpha^0\end{array}$$

Note that because polynomial arithmetic is being used (addition and subtraction are exclusive-OR operations), the sums of identical terms cancel, leaving only the $\beta_i^2\alpha^{2i}$ terms. In addition, note that from equation (4), $\beta_i \in \{0,1\}$, thus $\beta_i^2 = \beta_i$. Therefore $$\beta^2 = \sum_{i=0}^{n-1} \beta_i \alpha^i \quad (5)$$

To compute $\beta^4$, we note that $$\beta^4 = \beta^2 \times \beta^2 = \left(\sum_{i=0}^{n-1} \beta_i \alpha^{2i}\right) \times \left(\sum_{i=0}^{n-1} \beta_i \alpha^{2i}\right) \quad (6)$$

As was shown for $\beta^2$, the cross products of the two summations equal 0, leaving only the $\beta_i^2 \alpha^{4i}$ terms, which reduces to $$\beta^4 = \sum_{i=0}^{n-1} \beta_i \alpha^{4i} \quad (7)$$

since $\beta_i \in \{0,1\}$ and $\beta_i^4 = \beta_i$. By extension, it follows that this relationship holds for all non-negative powers of 2, i.e., $\beta^{2^m}$:

$$\beta^{2^m} = \sum_{i=0}^{n-1} \beta_i \alpha^{2^m i}, \ m \in \{0, 1, 2, \dots\} \quad (8)$$

In order to create an efficient method of computing $\beta^{2^m}$, equation (8) is restated using the following matrix relationship:

$$\beta^{2^m} = \theta^{2^m} \times \beta \quad (9)$$

where $\theta^{2^m} = \begin{bmatrix} (\alpha^{n-1})^{2^m} \\ (\alpha^{n-2})^{2^m} \\ \dots \\ (\alpha^1)^{2^m} \\ (\alpha^0)^{2^m} \end{bmatrix}^T$ and $\beta = \begin{bmatrix} \beta_{n-1} \\ \beta_{n-2} \\ \dots \\ \beta_1 \\ \beta_0 \end{bmatrix}$ $\eta^{2^m}$ is an exponentiation matrix and is equal to the transform of the first n elements of the field raised to the $2^m$ power. This matrix is multiplied by the vector form of the field value, using standard sum of product computations, to generate the result. Note that the transform matrix will contain only values of 0 and 1, thereby greatly simplifying the array computations. Also note that the transform matrix is a constant given a specific generator polynomial, and thus can be pre-computed. The result is a simple transformation of the input field value.

Briefly, a generator polynomial is an equation used to adapt the arithmetic operations in a Galois field in a modulo manner such that any arithmetic operation on elements of the field result in another element of the field. For example, suppose the digits of $\beta$ in the foregoing example are coefficients of a polynomial:

$$\beta_4\alpha^4 + \beta_3\alpha^3 + \beta_2\alpha^2 + \beta_1\alpha^1 + \beta_0\alpha^0 \quad (10)$$

If, for example, this expression is squared, there will be terms with exponents of a greater than $\alpha^4$ with non-zero coefficients, which would inherently be outside of the field. The polynomial generator in effect maps higher order terms back into the terms of the field in a deterministic manner when performing arithmetic operations. This will be demonstrated with an example below. While the technique described herein employs a particular Galois field and a particular generator polynomial, it will be appreciated that the invention is not limited to any particular Galois (finite) field or field size or any particular generator polynomial, and the concepts described herein can be applied to other finite fields and other generator polynomials.

Given a method for constructing a circuit to compute $\beta^{2^m}$, an efficient multiplicative inversion technique can be constructed, using the equality from equation (2). Note that all the terms of equation (2) are of the form $\beta^{2^m}$ and are functions of the input field value $\beta$. Therefore, all the terms can be computed in parallel and the product can be computed using a balanced multiplication tree, as shown previously in FIG. 3. The circuit also uses the pre-computed exponentiation matrix that is both smaller and faster than traditional circuitry.

By way of example, given a field over GF($2^5$) with a generator polynomial of $\alpha^5+\alpha^2+1$ ($00101_2$), the $\beta^{2^m}$ operations are computed as follows:

$$\theta^2 = \begin{bmatrix} (\alpha^{n-1})^2 \\ (\alpha^{n-2})^2 \\ \ldots \\ (\alpha^1)^2 \\ (\alpha^0)^2 \end{bmatrix}^T = \begin{bmatrix} (\alpha^4)^2 \\ (\alpha^3)^2 \\ (\alpha^2)^2 \\ (\alpha^1)^2 \\ (\alpha^0)^2 \end{bmatrix}^T = \begin{bmatrix} 0 & 1 & 1 & 0 & 1 \\ 0 & 1 & 0 & 1 & 0 \\ 1 & 0 & 0 & 0 & 0 \\ 0 & 0 & 1 & 0 & 0 \\ 0 & 0 & 0 & 0 & 1 \end{bmatrix}^T = \begin{bmatrix} 0 & 0 & 1 & 0 & 0 \\ 1 & 1 & 0 & 0 & 0 \\ 1 & 0 & 0 & 1 & 0 \\ 0 & 1 & 0 & 0 & 0 \\ 1 & 0 & 0 & 0 & 1 \end{bmatrix}$$

$$\theta^4 = \begin{bmatrix} (\alpha^{n-1})^4 \\ (\alpha^{n-2})^4 \\ \ldots \\ (\alpha^1)^4 \\ (\alpha^0)^4 \end{bmatrix}^T = \begin{bmatrix} (\alpha^4)^4 \\ (\alpha^3)^4 \\ (\alpha^2)^4 \\ (\alpha^1)^4 \\ (\alpha^0)^4 \end{bmatrix}^T = \begin{bmatrix} 1 & 1 & 0 & 1 & 1 \\ 0 & 1 & 1 & 1 & 0 \\ 0 & 1 & 1 & 0 & 1 \\ 1 & 0 & 0 & 0 & 0 \\ 0 & 0 & 0 & 0 & 1 \end{bmatrix}^T = \begin{bmatrix} 1 & 0 & 0 & 1 & 0 \\ 1 & 1 & 1 & 0 & 0 \\ 0 & 1 & 1 & 0 & 0 \\ 1 & 1 & 0 & 0 & 0 \\ 1 & 0 & 1 & 0 & 1 \end{bmatrix}$$

$$\theta^8 = \begin{bmatrix} (\alpha^{n-1})^8 \\ (\alpha^{n-2})^8 \\ \ldots \\ (\alpha^1)^8 \\ (\alpha^0)^8 \end{bmatrix}^T = \begin{bmatrix} (\alpha^4)^8 \\ (\alpha^3)^8 \\ (\alpha^2)^8 \\ (\alpha^1)^8 \\ (\alpha^0)^8 \end{bmatrix}^T = \begin{bmatrix} 0 & 0 & 0 & 1 & 0 \\ 1 & 1 & 1 & 1 & 0 \\ 1 & 1 & 0 & 1 & 1 \\ 0 & 1 & 1 & 0 & 1 \\ 0 & 0 & 0 & 0 & 1 \end{bmatrix}^T = \begin{bmatrix} 0 & 1 & 1 & 0 & 0 \\ 0 & 1 & 1 & 1 & 0 \\ 0 & 1 & 0 & 1 & 0 \\ 1 & 1 & 1 & 0 & 0 \\ 0 & 0 & 1 & 1 & 1 \end{bmatrix}$$

$$\theta^{16} = \begin{bmatrix} (\alpha^{n-1})^{16} \\ (\alpha^{n-2})^{16} \\ \ldots \\ (\alpha^1)^{16} \\ (\alpha^0)^{16} \end{bmatrix}^T = \begin{bmatrix} (\alpha^4)^{16} \\ (\alpha^3)^{16} \\ (\alpha^2)^{16} \\ (\alpha^1)^{16} \\ (\alpha^0)^{16} \end{bmatrix}^T = \begin{bmatrix} 0 & 0 & 1 & 0 & 0 \\ 1 & 0 & 0 & 1 & 1 \\ 0 & 0 & 0 & 1 & 0 \\ 1 & 1 & 0 & 1 & 1 \\ 0 & 0 & 0 & 0 & 1 \end{bmatrix}^T = \begin{bmatrix} 0 & 1 & 0 & 1 & 0 \\ 0 & 0 & 0 & 1 & 0 \\ 1 & 0 & 0 & 0 & 0 \\ 0 & 1 & 1 & 1 & 0 \\ 0 & 1 & 0 & 1 & 1 \end{bmatrix}$$

To assist with understanding, an explanation of how the elements of matrix $\theta^2$ are generated is provided. The same methodology can be extended to matrices $\theta^4$, $\theta^8$, and $\theta^{16}$ in a straightforward manner. In the matrix representation, $\alpha^0$ is expressed as the row of values 00001, $\alpha^1$ is expressed as the row of values 00010, $\alpha^2$ is expressed as the row of values 00100, $\alpha^3$ is expressed as the row of values 01000, and $\alpha^4$ is expressed as the row of values 10000.

The bottom row of the transposed $\theta^2$ matrix is $(\alpha^0)^2 = \alpha^0 = 00001$.

The second row from the bottom of the transposed $\theta^2$ matrix is $(\alpha^1)^2 = \alpha^2 = 00100$.

The middle row of the transposed $\theta^2$ matrix is $(\alpha^2)^2 = \alpha^4 = 10000$.

The second row from the top of the transposed $\theta^2$ matrix is $(\alpha^3)^2 = \alpha^6$. Representing $\alpha^6$ in the matrix requires consideration of the generator polynomial, $\alpha^5+\alpha^2+1=0$. Using polynomial algebra (addition and subtraction are the XOR operation), this polynomial can be rewritten as $\alpha^5=\alpha^2+1$, or $\alpha^5=\alpha^2+\alpha^0$. Consequently, $\alpha^6$ can be rewritten as $\alpha^6=\alpha^1\alpha^5$. Substituting $\alpha^2+\alpha^0$ for $\alpha^5$ yields $\alpha^6=\alpha^1(\alpha^2+\alpha^0)=\alpha^3+\alpha^1$, which is expressed as 01010 in the matrix, since only $\alpha^3$ and $\alpha^1$ have a coefficient of 1.

The top row of the transposed $\theta^2$ matrix is $(\alpha^4)^2=\alpha^8$. Repeatedly using the substitution $\alpha^5=\alpha^2+\alpha^0$ yields: $\alpha^8=\alpha^3\alpha^5=\alpha^3(\alpha^2+\alpha^0)=\alpha^5+\alpha^3=(\alpha^2+\alpha^0)+\alpha^3=\alpha^3+\alpha^2+\alpha^0$, which is expressed as 01101 in the matrix. By performing similar substitutions with higher order terms of $\alpha$, the matrix elements of $\theta^4$, $\theta^8$, $\theta^{16}$ shown above can readily be determined.

To illustrate the application of the exponentiation matrix $\theta^{2^m}$, $\beta^2$ is found using the following equation (again noting that addition is carried out as a logical exclusive-OR operation):

$$\beta^2 = \theta^2 \times \beta = \begin{bmatrix} 0 & 0 & 1 & 0 & 0 \\ 1 & 1 & 0 & 0 & 0 \\ 1 & 0 & 0 & 1 & 0 \\ 0 & 1 & 0 & 0 & 0 \\ 1 & 0 & 0 & 0 & 1 \end{bmatrix} \times \begin{bmatrix} \beta_4 \\ \beta_3 \\ \beta_2 \\ \beta_1 \\ \beta_0 \end{bmatrix} = \begin{bmatrix} \beta_2 \\ \beta_4 \oplus \beta_3 \\ \beta_4 \oplus \beta_1 \\ \beta_3 \\ \beta_4 \oplus \beta_0 \end{bmatrix}$$

Figure 4A:
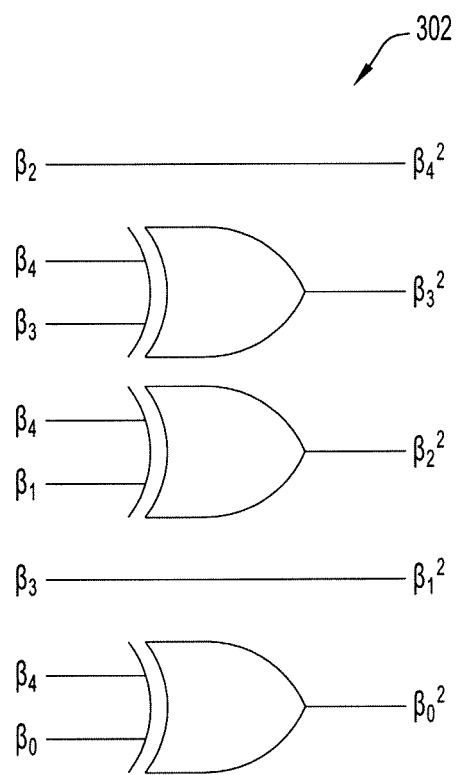
FIGS. 4A-D are circuit diagrams illustrating logic circuits for generating powers of an element of a Galois field required to compute the multiplicative inverse of the element for a specific generator polynomial.

This array maps into the digital logic circuit shown in FIG. 4A. In other words, for this particular generator polynomial, the exponentiation circuit 302 shown in FIG. 3 can be implemented with the logic circuit shown in FIG. 4A. In particular, the five bits $\beta_4$, $\beta_3$, $\beta_2$, $\beta_1$, and $\beta_0$ of an input element $\beta$ are mapped into the five bits of the output $\beta^2$ as follows:

$\beta_4^2 = \beta_2$, $\beta_3^2 = \beta_4 \oplus \beta_3$, $\beta_2^2 = \beta_4 \oplus \beta_1$, $\beta_1^2 = \beta_3$, and $\beta_0^2 = \beta_4 \oplus \beta_1$, Therefore, computing $\beta^2$ over GF($2^5$) with a generator polynomial of $\alpha^5+\alpha^2+1$ requires three 2-input Exclusive-OR functions. If implemented in a field programmable gate array (FPGA), a total of three logic elements (look up tables, or LUTS) would be required to perform the operation.

Figure 4B:
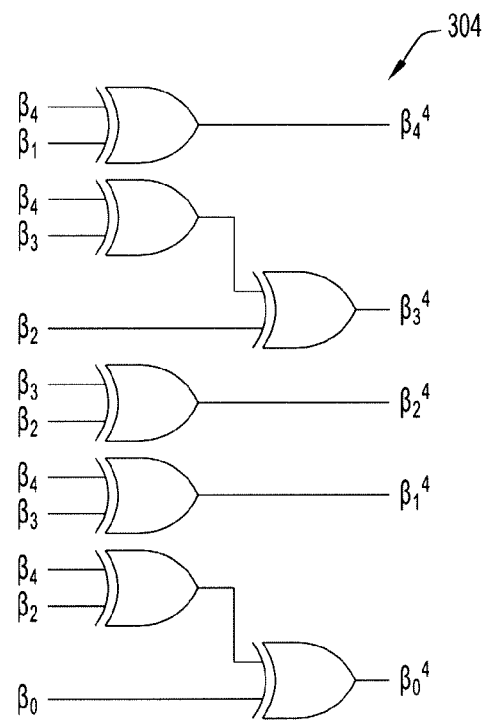
Figure 4C:
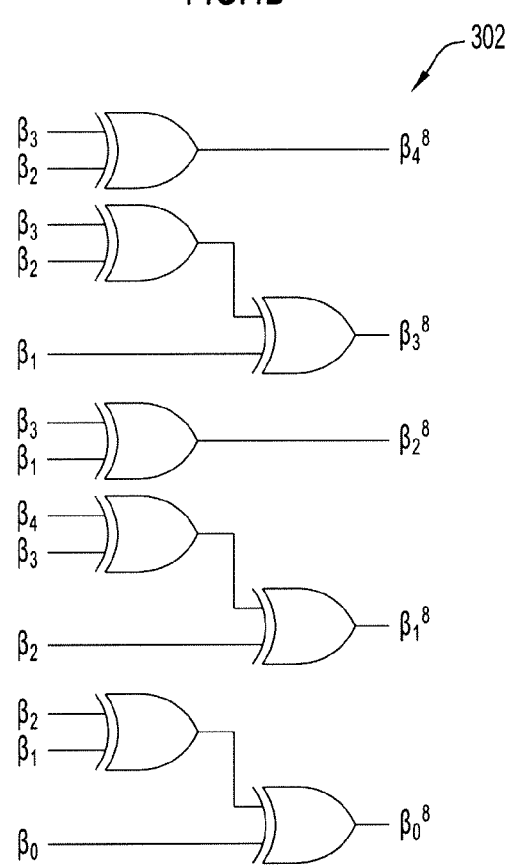
Figure 4D:
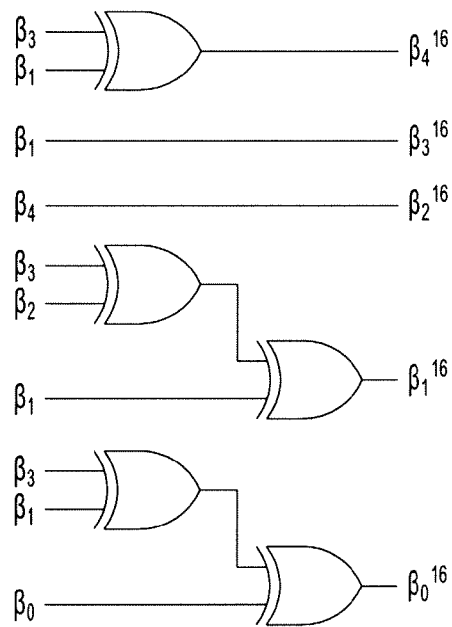

FIGS. 4B-4D show the logic diagrams for the remaining required $\beta^{2^m}$ operations, namely, the $\beta^4$, $\beta^8$, and $\beta^{16}$ exponential generators 304, 306, and 308 of FIG. 3, respectively, for this polynomial generator example. More specifically, the $\beta^4$ exponential generator 304 shown in FIG. 4B maps the input bits of an element $\beta$ into the output bits of $\beta^4$. In accordance with equation (9), $\beta^4=\theta^4\times\beta$. For the matrix $\theta^4$ given above for this generator polynomial, the bits of $\beta^4$ are determined as:

$\beta_4^4 = \beta_4 \oplus \beta_1$, $\beta_3^4 = \beta_4 \oplus \beta_3 \oplus \beta_2$, $\beta_2^4 = \beta_3 \oplus \beta_2$, $\beta_1^4 = \beta_4 \oplus \beta_3$, and $\beta_0^4 = \beta_4 \oplus \beta_2 \oplus \beta_0$.

The $\beta^8$ exponential generator 306 shown in FIG. 4C maps the input bits of an element $\beta$ into the output bits of $\beta^8$. In accordance with equation (9), $\beta^8=\theta^8\times\beta$. For the matrix $\theta^8$ given above for this generator polynomial, the bits of $\beta^8$ are determined as:

$\beta_4^8 = \beta_3 \oplus \beta_2$, $\beta_3^8 = \beta_3 \oplus \beta_2 \oplus \beta_1$, $\beta_2^8 = \beta_3 \oplus \beta_1$, $\beta_1^8 = \beta_4 \oplus \beta_3 \oplus \beta_2$, and The $\beta^{16}$ exponential generator 308 shown in FIG. 4D maps the input bits of an element $\beta$ into the output bits of $\beta^{16}$. In accordance with equation (9), $\beta^{16}=\theta^{16}\times\beta$. For the matrix $\theta^{16}$ given above for this generator polynomial, the bits of $\beta^{16}$ are determined as:

$\beta_4^{16} = \beta_3 \oplus \beta_1$, $\beta_3^{16} = \beta_1$, $\beta_2^{16} = \beta_4$, $\beta_1^{16} = \beta_3 \oplus \beta_2 \oplus \beta_1$, and $\beta_0^{16} = \beta_3 \oplus \beta_1 \oplus \beta_0$.

Examining the remaining $\beta^{2^m}$ operators, a total of 23 2-input exclusive-OR functions are required to perform all the field exponentiation operations $\beta^2$, $\beta^4$, $\beta^8$, and $\beta^{16}$. Even fewer are required if certain redundancy is eliminated. For example, two of the two-input exclusive-OR functions of the $\beta^4$ exponentiation circuit 304 shown in FIG. 4B have the same inputs $\beta_3$ and $\beta_4$. Instead, a single exclusive-OR function could be used whose output is used both as the output $\beta_1^4$ and as an input to another two-input exclusive-OR function along with $\beta_2$ to produce $\beta_3^4$. Ignoring the savings gained by eliminating such redundancy, the total number of exclusive-OR operations required to generate the exponential values in this example is broken down in Table 1.

TABLE 1

Galois field Exponentiation Function Requirements

| Value | Exclusive-OR Functions | FPGA LUTs |
|---|---|---|
| $\beta^2$ | 3 | 3 |
| $\beta^4$ | 7 | 5 |
| $\beta^8$ | 8 | 5 |
| $\beta^{16}$ | 5 | 3 |
| Total | 23 | 16 |

By way of comparison, a full Galois multiplier requires 19 2-input Exclusive-OR functions and 16 2-input logical AND functions. Thus, all the exponentiation operations required to perform a multiplicative inversion occur in approximately one-third the size of a single Galois field multiplier.

Figure 1:
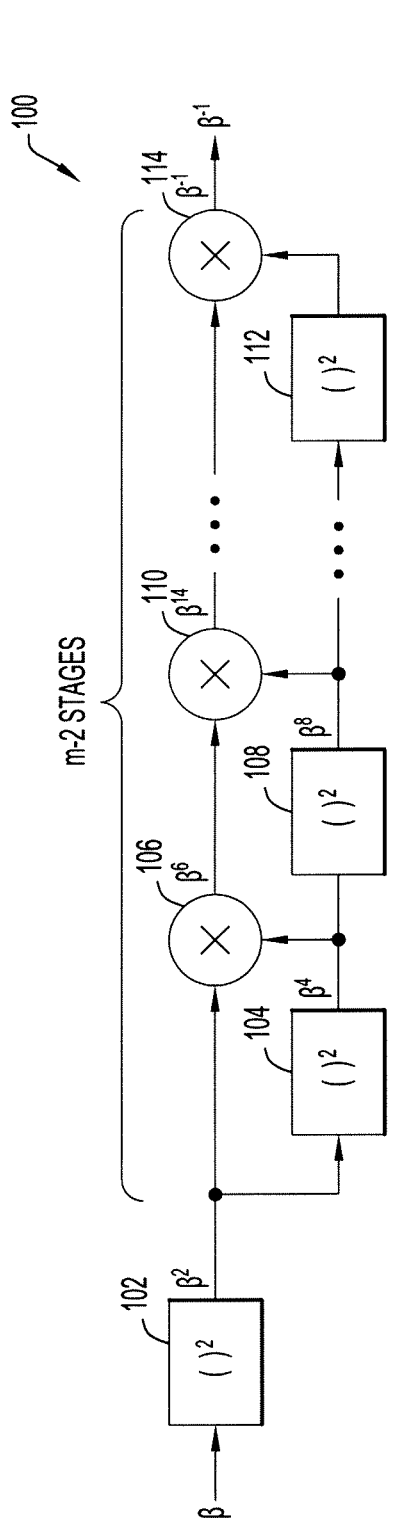
FIG. 1 is a block diagram illustrating a serial computation architecture for computing a multiplicative inverse of an element of a Galois field.
Figure 2:
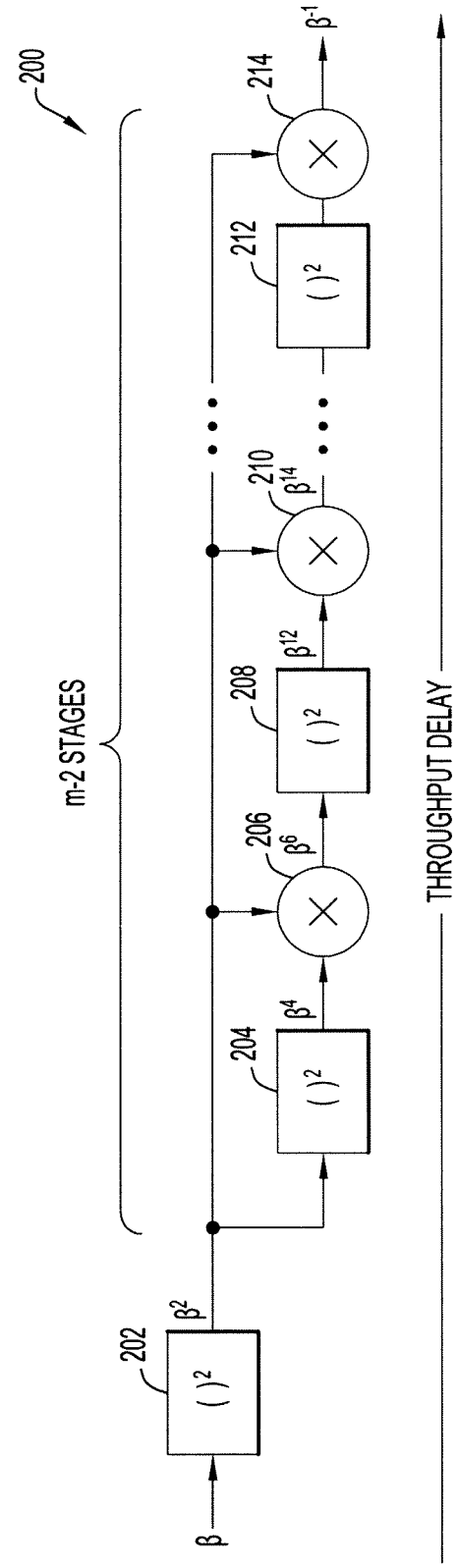
FIG. 2 is a block diagram illustrating another serial computation architecture for computing a multiplicative inverse of an element of a Galois field.

The multi-stage serial squaring-and-multiplying techniques illustrated in FIGS. 1 and 2 are convenient from the standpoint that a standard multiplier circuit can be used to carry out both the squaring and multiplication operations (the squaring operation involves multiplying an input by itself), and the multiplicative inverse of a finite field element can be computed by stringing together a number of such multiplier circuits in a multi-stage configuration.

A unique aspect of the technique described herein is that the $2^m$ powers of a finite field element are computed in a more elegant and efficient manner without the use of multipliers or look-up tables that implement multiplication operations. Rather, the technique is based on the insight that there is actually a combinatorial way to represent the $2^m$ powers of a finite field element which is much simpler and can be implemented in parallel.

The expression in equation (8) is important in understanding how exponentiation circuits can be constructed with relatively few components and/or operations. In effect, as higher orders of $\beta$ are computed, the cross-products keep disappearing (canceling out) such that the computations do not become more complex even at higher powers of $\beta$. This characteristic permits the relationships between $\beta$ and the powers of $\beta$ to be represented in a simple n×n exponentiation matrix which transforms the digits (in this case bits) $\beta$ to digits (bits) of the output power of $\beta$ ($\beta^{2^m}$). The exponentiation matrix can be implemented using only combinatory logic, where each bit of the output exponential $\beta^{2^m}$ is either equal to the value of one of the input bits of $\beta$ or an exclusive-OR combination of certain bits of $\beta$. This is because, by its nature, the exponentiation matrix yields summations of input bits, which are performed logically as an exclusive-OR operation. As used herein and in the claims the terms combinatory logic and combinatory logic circuits refer to circuitry (implemented in hardware, software, look-up tables, or combinations thereof) that maps input digits to output digits based on only logical relationships. These logical relationships include mapping logical combinations of certain input digits of an input field element to output digits of the output field element. These logical relationships may also include the direct mapping of an input digit to an output digit in some instances, as shown for example with the direct mapping of input bit $\beta_2$ to output bit $\beta_4^2$ in exponentiation circuit 302 in FIG. 4A. All of the logical combinations employed by the combinatory logic are exclusive-OR combinations of the input digits.

Figure 5:
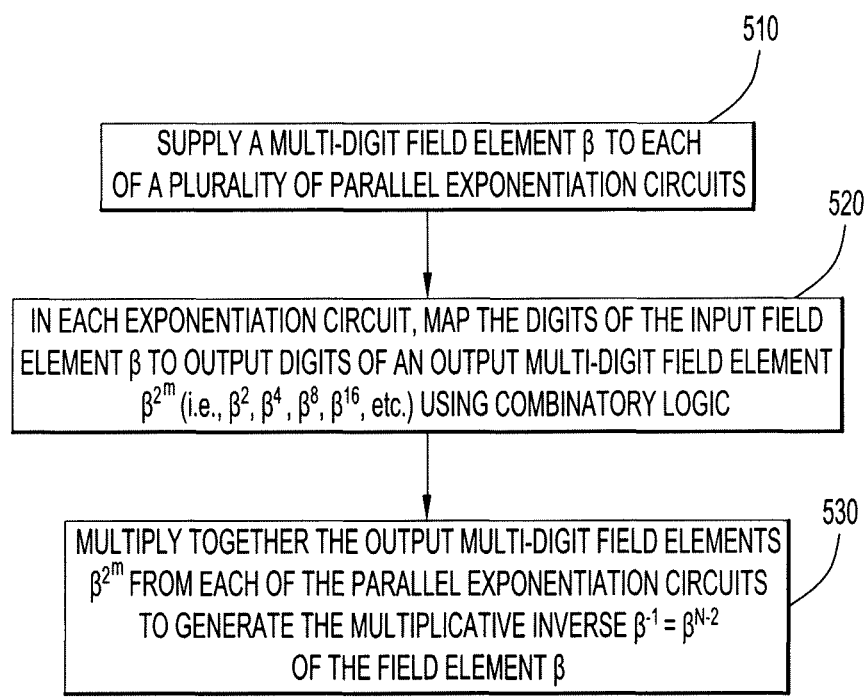
FIG. 5 is a flow diagram illustrating operations to perform exponentiation of an element of a Galois field and to generate a multiplicative inverse of an element of a Galois field in accordance with an embodiment of the invention.

FIG. 5 is a flow diagram summarizing the operations performed to carry out exponentiation of a finite field element and computation of the multiplicative inverse of a field element in accordance with an embodiment of the invention. In operation 510, a multi-digit field element $\beta$ of a finite field is supplied to each of a plurality of parallel exponentiation circuits. In operation 520, each of the exponentiation circuits essentially maps the digits of the input field element $\beta$ to output digits of an output multi-digit field element $\beta^{2^m}$, which is a $2^m$ power of the input field element $\beta$, where m is an integer greater than zero and where the value of m is different for each exponentiation circuit. This mapping is accomplished using combinatory logic circuits. In operation 530, the output multi-digit field elements $\beta^{2^m}$ from each of the parallel exponentiation circuits are multiplied together to generate the multiplicative inverse of the field element $\beta$.

Although not applicable to the subject of Galois field inversion, the matrix algebra approach used to derive the exponentiation matrices also applies to multiplying a Galois field value by a constant $\alpha^N$:

$$\alpha^N \times \beta = \theta_N \times \beta \qquad (11)$$

where $$\theta_N = \begin{bmatrix} \alpha^{n-1} \times \alpha^N \\ \alpha^{n-2} \times \alpha^N \\ \ldots \\ \alpha^1 \times \alpha^N \\ \alpha^0 \times \alpha^N \end{bmatrix}^T = \begin{bmatrix} \alpha^{N+n-1} \\ \alpha^{N+n-2} \\ \ldots \\ \alpha^{N+1} \\ \alpha^N \end{bmatrix}^T \text{ and } \beta = \begin{bmatrix} \beta_{n-1} \\ \beta_{n-2} \\ \ldots \\ \beta_1 \\ \beta_0 \end{bmatrix}$$

Continuing with the example of a field over $GF(2^5)$ with a generator polynomial of $\alpha^5 + \alpha^2 + 1$ ($00101_2$), multiplying a field value by $\alpha^7$ would be computed as follows:

$$\theta_7 = \begin{bmatrix} \alpha^{N+n-1} \\ \alpha^{N+n-2} \\ \ldots \\ \alpha^{N+1} \\ \alpha^N \end{bmatrix}^T = \begin{bmatrix} \alpha^{11} \\ \alpha^{10} \\ \alpha^9 \\ \alpha^8 \\ \alpha^7 \end{bmatrix}^T = \begin{bmatrix} 0 & 0 & 1 & 1 & 1 \\ 1 & 0 & 0 & 0 & 1 \\ 1 & 1 & 0 & 1 & 0 \\ 0 & 1 & 1 & 0 & 1 \\ 1 & 0 & 1 & 0 & 0 \end{bmatrix}^T = \begin{bmatrix} 0 & 1 & 1 & 0 & 1 \\ 0 & 0 & 1 & 1 & 0 \\ 1 & 0 & 0 & 1 & 1 \\ 1 & 0 & 1 & 0 & 0 \\ 1 & 1 & 0 & 1 & 0 \end{bmatrix}$$

$$\alpha^7 \times \beta = \theta_7 \times \beta = \begin{bmatrix} 0 & 1 & 1 & 0 & 1 \\ 0 & 0 & 1 & 1 & 0 \\ 1 & 0 & 0 & 1 & 1 \\ 1 & 0 & 1 & 0 & 0 \\ 1 & 1 & 0 & 1 & 0 \end{bmatrix} \times \begin{bmatrix} \beta_4 \\ \beta_3 \\ \beta_2 \\ \beta_1 \\ \beta_0 \end{bmatrix} = \begin{bmatrix} \beta_3 \oplus \beta_2 \oplus \beta_0 \\ \beta_2 \oplus \beta_1 \\ \beta_4 \oplus \beta_1 \oplus \beta_0 \\ \beta_4 \oplus \beta_2 \\ \beta_4 \oplus \beta_3 \oplus \beta_1 \end{bmatrix}$$

Figure 6:
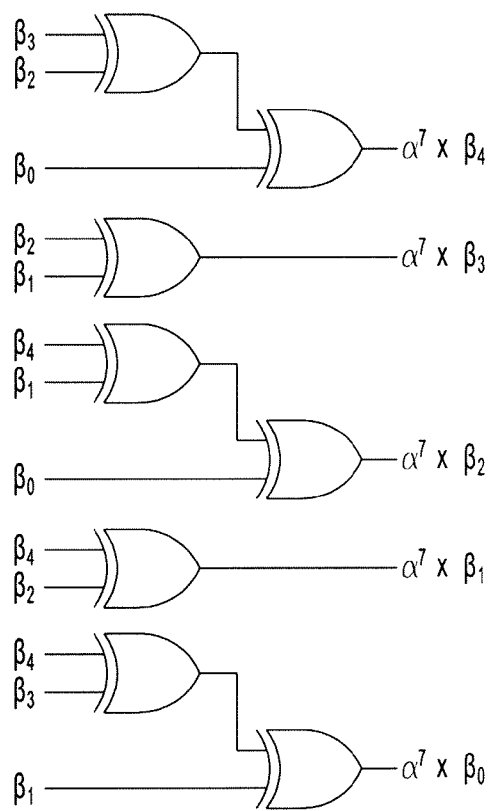
FIG. 6 is a circuit diagram illustrating logic circuits for multiplying an element of a Galois field by a constant according to another embodiment of the invention.

Therefore, computing $\alpha^7 \times \beta$ over $GF(2^5)$ with a generator polynomial of $\alpha^5 + \alpha^2 + 1$ requires eight 2-input exclusive-OR functions. This array maps into the digital logic circuit shown in FIG. 6. If implemented in an FPGA, a total of five LUTs would be required to perform the operation.

Taking into consideration this extension of multiplying a finite field element by a constant, it will be appreciated that the invention encompasses the use of matrix algebra with finite field elements, resulting in arrays that are summations of input values that can be used to raise a field element to a power or to carry out multiplication by a constant.

The invention can be used in any hardware or software application that requires finite field arithmetic, such as encryption or forward error correction algorithms. As previously described, forward error correction codes are used extensively in communications to ensure the accuracy of data being received. Properly encoding data with finite field arithmetic allows a relatively small check word to be used to check the accuracy of a large amount of data and to determine which data is erroneous. Using the techniques of the present invention, the computations required to perform these types of operations can be carried out with less hardware and/or less and faster processing.

Having described preferred embodiments of circuits and methods for performing exponentiation and inversion of finite field elements, it is believed that other modifications, variations and changes will be suggested to those skilled in the art in view of the teachings set forth herein. It is therefore to be understood that all such variations, modifications and changes are believed to fall within the scope of the present invention as defined by the appended claims. Although specific terms are employed herein, they are used in a generic and descriptive sense only and not for purposes of limitation.

What is claimed is:

1. A circuit for generating a multiplicative inverse of a finite field element, comprising:
    a plurality of parallel exponentiation circuits, each of the parallel exponentiation circuits comprising combinatory logic circuits configured to receive input digits of a multi-digit field element $\beta$ of a finite field, the combinatory logic circuits being further configured to map the input digits to output digits of an output multi-digit field element $\beta^{2^m}$, where m is an integer greater than zero and m has a different value for each of the parallel exponentiation circuits; and
    a plurality of multiplier circuits configured to multiply together outputs of the parallel exponentiation circuits to generate the multiplicative inverse of the field element $\beta$.

2. The circuit of claim 1, wherein at least some of the output digits are generated by the combinatory logic circuits as logical combinations of certain input digits and at least some of the output digits are generated by the combinatory logic circuits from only one of the input digits by directly mapping an input digit to an output digit.

3. The circuit of claim 1, wherein the parallel exponentiation circuits do not perform any multiplication operations.

4. The circuit of claim 1, wherein the parallel exponentiation circuits generate exponential powers of the field element $\beta$ using only combinatory logic on the digits of the field element $\beta$.

5. The circuit of claim 4, wherein the combinatory logic includes only exclusive-OR combinations.

6. The circuit of claim 4, wherein the combinatory logic implements logical relationships between the field element $\beta$ and the output field element $\beta^{2^m}$ specified by an exponentiation matrix.

7. The circuit of claim 6, wherein the exponentiation matrix implemented by the combinatory logic circuits is an n×n matrix equal to the transform of the first n elements of the finite field raised to the $2^m$ power, where n is the number of digits of the multi-digit field element $\beta$.

8. The circuit of claim 1, wherein the multi-digit field element $\beta$ is a multi-bit binary field element.

9. The circuit of claim 1, wherein each of the exponentiation circuits is implemented with at least one of: a look-up table; a plurality of exclusive-OR gates; and software.

10. The circuit of claim 1, wherein each of the parallel exponentiation circuits is configured to generate the output multi-digit field element $\beta^{2^m}$ directly from only the input digits of the multi-digit field element $\beta$, and none of the outputs of any of the parallel exponentiation circuits is an input to any of the parallel exponentiation circuits.

11. A method for generating a multiplicative inverse of a finite field element, comprising:
    receiving input digits of a multi-digit field element $\beta$ of a finite field at a plurality of parallel exponentiation circuits, each of the parallel exponentiation circuits:
        generating an output multi-digit field element $\beta^{2^m}$ for a different value of m, where m is a positive integer, by mapping via combinatory logic circuits the input digits to output digits of the output multi-digit field element $\beta^{2^m}$; and
        supplying the output multi-digit field element $\beta^{2^m}$ as an output of the exponentiation circuit; and
    multiplying together outputs of the parallel exponentiation circuits to generate the multiplicative inverse of the field element $\beta$.

12. The method of claim 11, wherein at least some of the output digits are generated by the combinatory logic circuits as logical combinations of certain input digits and at least some of the output digits are generated by the combinatory logic circuits from only one of the input digits by directly mapping an input digit to an output digit.

13. The method of claim 11, wherein the parallel exponentiation circuits generate respective output multi-digit field elements $\beta^{2^m}$ without performing any multiplication operations.

14. The method of claim 11, wherein the parallel exponentiation circuits generate exponential powers of the field element $\beta$ using only combinatory logic on the digits of the field element $\beta$.

15. The method of claim 11, wherein the method implements, via the combinatory logic circuits in each of the parallel exponentiation circuits, logical relationships between the field element $\beta$ and the output field element $\beta^{2^m}$ specified by an exponentiation matrix.

16. The method of claim 11, wherein each of the output multi-digit field elements $\beta^{2^m}$ is generated directly from only the input digits of the multi-digit field element $\beta$, and none of the output multi-digit field elements $\beta^{2^m}$ is generated from outputs of any of the parallel exponentiation circuits.

17. The method of claim 11, wherein the multi-digit field element $\beta$ is a multi-bit binary field element.

18. The method of claim 11, wherein generating the output multi-digit field elements $\beta^{2^m}$ is performed via at least one of: a look-up table; a plurality of exclusive-OR gates; and software.

19. The method of claim 14, wherein the combinatory logic that generates the output multi-digit field elements $\beta^{2^m}$ includes only exclusive-OR combinations.

20. The method of claim 15, wherein the exponentiation matrix implemented by the combinatory logic circuits is an n×n matrix equal to the transform of the first n elements of the finite field raised to the $2^m$ power, where n is the number of digits of the multi-digit field element $\beta$.

* * * * *